United States Patent
Midoun et al.

(10) Patent No.: US 9,637,076 B2
(45) Date of Patent: May 2, 2017

(54) ENERGY ABSORBING DEVICE FOR BUMPER ASSEMBLY

(71) Applicant: Ford Global Technologies, LLC, Dearborn, MI (US)

(72) Inventors: Djamal Eddine Midoun, Ann Arbor, MI (US); Laike Misikir, Ann Arbor, MI (US); Shekar Prabhakar Erasala, Northville, MI (US); Oliver O. Nwankwo, Canton, MI (US); Bin Zhang, Windsor (CA); Matthew B. Makowski, Northville, MI (US); Kirk David Arthurs, Newport, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 35 days.

(21) Appl. No.: 14/475,973

(22) Filed: Sep. 3, 2014

(65) Prior Publication Data
US 2016/0059809 A1    Mar. 3, 2016

(51) Int. Cl.
*B60R 19/34*    (2006.01)

(52) U.S. Cl.
CPC ................... *B60R 19/34* (2013.01)

(58) Field of Classification Search
CPC ......... B60R 19/34; B60R 19/12; B60R 19/30; B60R 19/38; B60R 19/40; B60R 2019/266; B62D 21/152; B62D 21/15; B62D 25/082; B62D 25/08; B62D 21/155; B62D 25/085; B62D 29/005; B62D 63/061; B62D 63/062; B62D 65/16

USPC ........................ 293/133, 118, 132, 136, 155; 296/187.09; 188/374, 376, 377
See application file for complete search history.

(56) References Cited

U.S. PATENT DOCUMENTS

| | | | |
|---|---|---|---|
| 3,899,047 A | 8/1975 | Maeda et al. | |
| 3,915,486 A * | 10/1975 | Maeda ................... | B60R 19/34 188/371 |
| 3,998,485 A * | 12/1976 | Putter ..................... | B60R 19/34 188/377 |
| 4,097,080 A * | 6/1978 | Petry ...................... | B60R 19/32 293/134 |
| 4,200,318 A | 4/1980 | Gute et al. | |
| 4,995,486 A * | 2/1991 | Garneweidner ........ | F16F 7/125 188/374 |
| 5,293,973 A * | 3/1994 | Thum .................... | B60R 19/26 188/377 |
| 6,409,239 B1 * | 6/2002 | Tjoelker ................ | F16F 7/127 188/376 |
| 6,523,873 B1 * | 2/2003 | Summe .................. | F16F 7/125 293/102 |

(Continued)

*Primary Examiner* — Glenn Dayoan
*Assistant Examiner* — Sunsurraye Westbrook
(74) *Attorney, Agent, or Firm* — Jason Rogers; Bejin Bieneman PLC

(57) ABSTRACT

An energy absorbing device for a bumper assembly of a vehicle includes a plunger. A deformable wall extends along an axis and defines a cavity for receiving the plunger during relative movement between the plunger and the deformable wall resulting from impact between the bumper assembly and another object. A ledge is fixed to the deformable wall and extends between the cavity and the plunger for collapsing the deformable wall into the cavity. The deformable wall collapses inwardly to eliminate material stack up to accommodate packaging restraints in the design of the bumper assembly.

20 Claims, 4 Drawing Sheets

(56) References Cited

U.S. PATENT DOCUMENTS

| | | | |
|---|---|---|---|
| 6,554,333 B2* | 4/2003 | Shimotsu | F16F 7/125 293/132 |
| 6,702,345 B1* | 3/2004 | Yoshida | B60R 19/34 188/377 |
| 6,834,898 B2 | 12/2004 | Wang et al. | |
| 6,854,574 B2* | 2/2005 | Yoshida | F16F 7/125 188/371 |
| 6,908,129 B2* | 6/2005 | Shimotsu | B60R 19/34 293/132 |
| 7,357,445 B2 | 4/2008 | Gross et al. | |
| 7,484,781 B1 | 2/2009 | Garber et al. | |
| 9,022,706 B2* | 5/2015 | Misikir | A61G 3/0875 296/20 |
| 2003/0209915 A1* | 11/2003 | Yoshida | F16F 7/125 293/133 |
| 2003/0222477 A1* | 12/2003 | Yoshida | F16F 7/125 296/187.03 |
| 2005/0110285 A1* | 5/2005 | Glasgow | B60R 19/34 293/133 |
| 2007/0236025 A1* | 10/2007 | Glasgow | B60R 19/34 293/133 |

* cited by examiner

ENERGY ABSORBING DEVICE FOR BUMPER ASSEMBLY

BACKGROUND

Vehicles, such as automobiles, include bumper assemblies at a front and/or at a rear of the vehicle. The bumper assembly may include a bumper beam that may plastically deform upon impact during a collision between the vehicle and another object. A fascia may cover the bumper beam and provide an aesthetic appearance.

The vehicle includes a frame having a rail. The bumper beam may be supported on the rail with crash cans, which connect to the bumper beam and to the rail. The crash cans are configured to crumple, and thus absorb energy, when subjected to compressive forces between the bumper beam and the rail during a collision between the vehicle and another object. The crash cans are fixed to the bumper beam and the rail and, as such, when the crash cans are crumpled during a collision, the rail of the frame must be replaced in order to provide new crash cans.

The material of each crash cans builds up as the crash can crumples during the collision. Some collisions of certain magnitudes may fully collapse the crush cans, i.e., the material of the crash can builds up to a point such that built-up material prevents further collapse of the crash cans. For example, a typical crash can, when fully compressed, are still 70-80% of the pre-compressed length of the crash can. When the crash can is fully collapsed, further movement of the bumper beam during the collision may cause the crash can and/or the bumper beam to pierce through the fascia. In such situations the fascia must be replaced. Such replacement is costly and negatively affects the rating of the vehicle during a low speed damageability (LSD) test. The LSD test measures the amount of damage to a vehicle during a low speed and damage to the body, sheet metal parts, etc., requiring replacement of these components is unfavorable to the results of the LSD test.

In addition, the stacked up material of the crash can spaces the bumper beam from the rail. However, for aesthetic purposes, some vehicles are designed with tight packaging constraints in the bumper assembly, e.g., low profile bumper assemblies. This stacked up material may not conform with these tight packaging constraints in the bumper assembly.

As such, there remains an opportunity to design an improved energy absorber that absorbs energy between the rail and the bumper beam and fits within tight packaging constraints.

DETAILED DESCRIPTION

Figure 1:
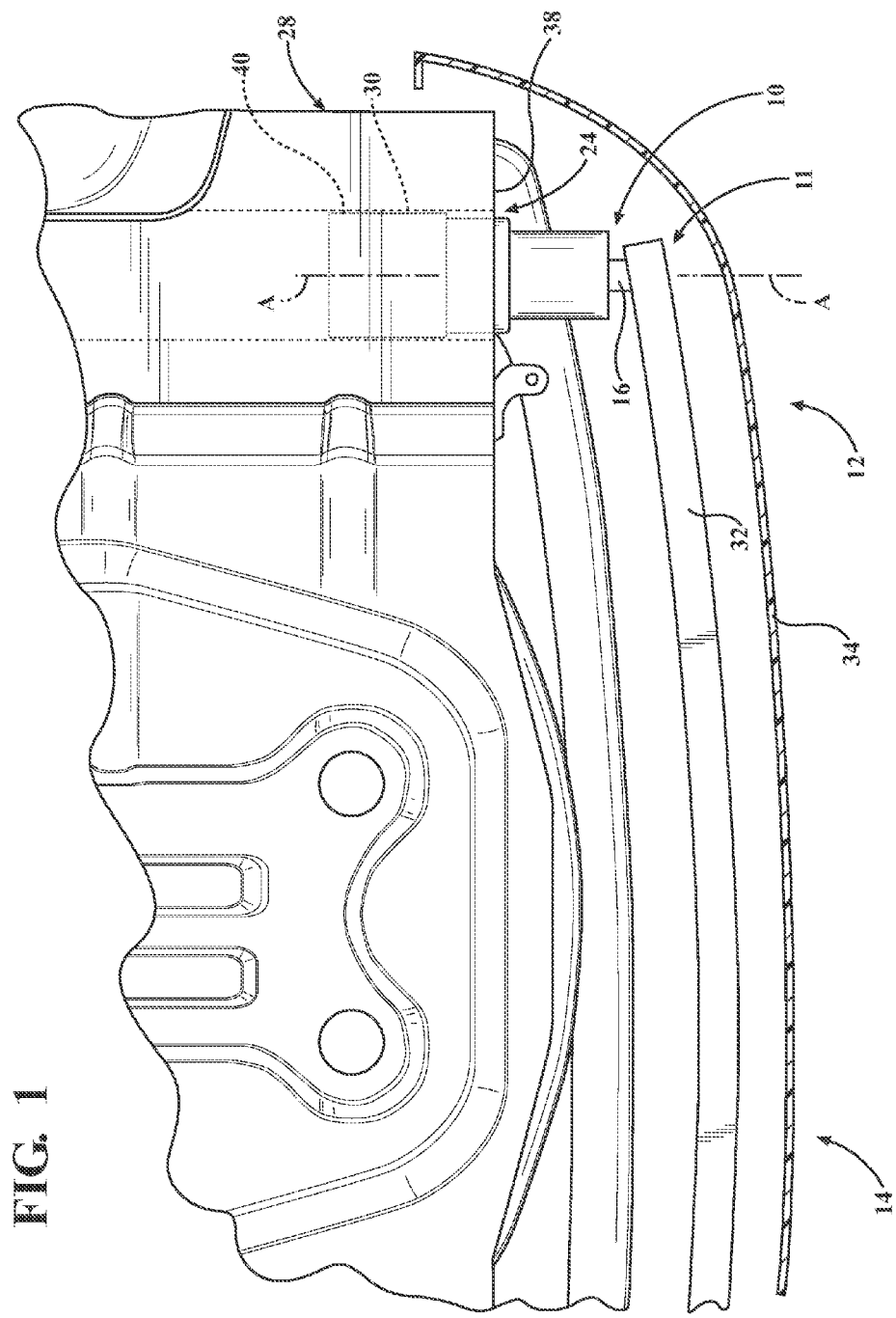
FIG. 1 is a bottom view of a vehicle including an energy absorbing system 11.

With reference to the Figures, wherein like numerals indicate like parts throughout the several views, an energy absorbing device 10 for a bumper assembly 12 of a vehicle 14 is generally shown. The energy absorbing device 10 includes a plunger 16 and a deformable wall 18 extending along an axis A. The deformable wall 18 defines a cavity 20 for receiving the plunger 16 during relative movement between the plunger 16 and the deformable wall 18. A ledge 22 is fixed to the deformable wall 18 and extends between the cavity 20 and the plunger 16 for collapsing the deformable wall 18 into the cavity 20.

Figure 3:
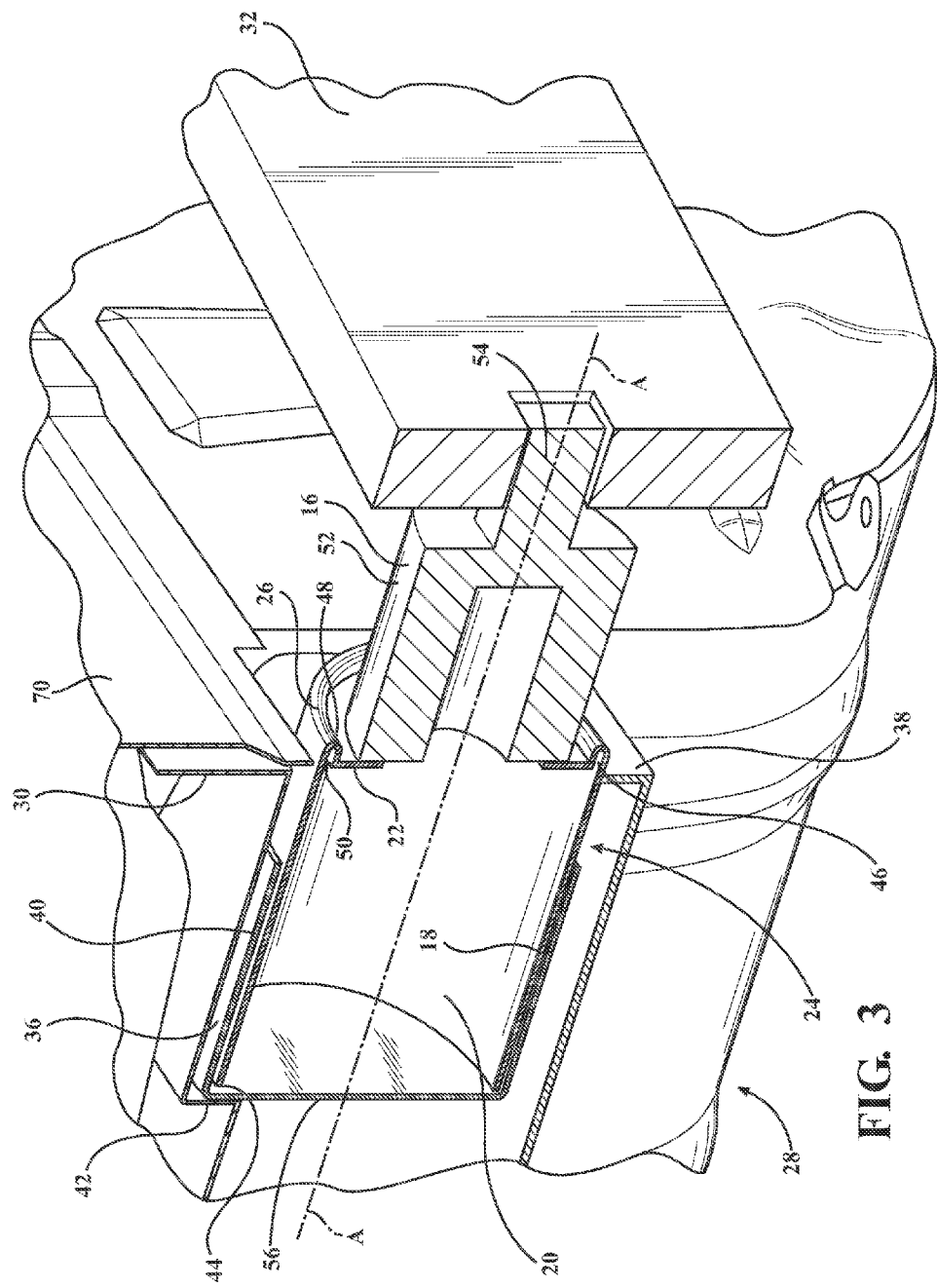
FIG. 3 is a cross-sectional view of the energy absorbing system 11 with a plunger in an extended position relative to a deformable wall.
Figure 4:
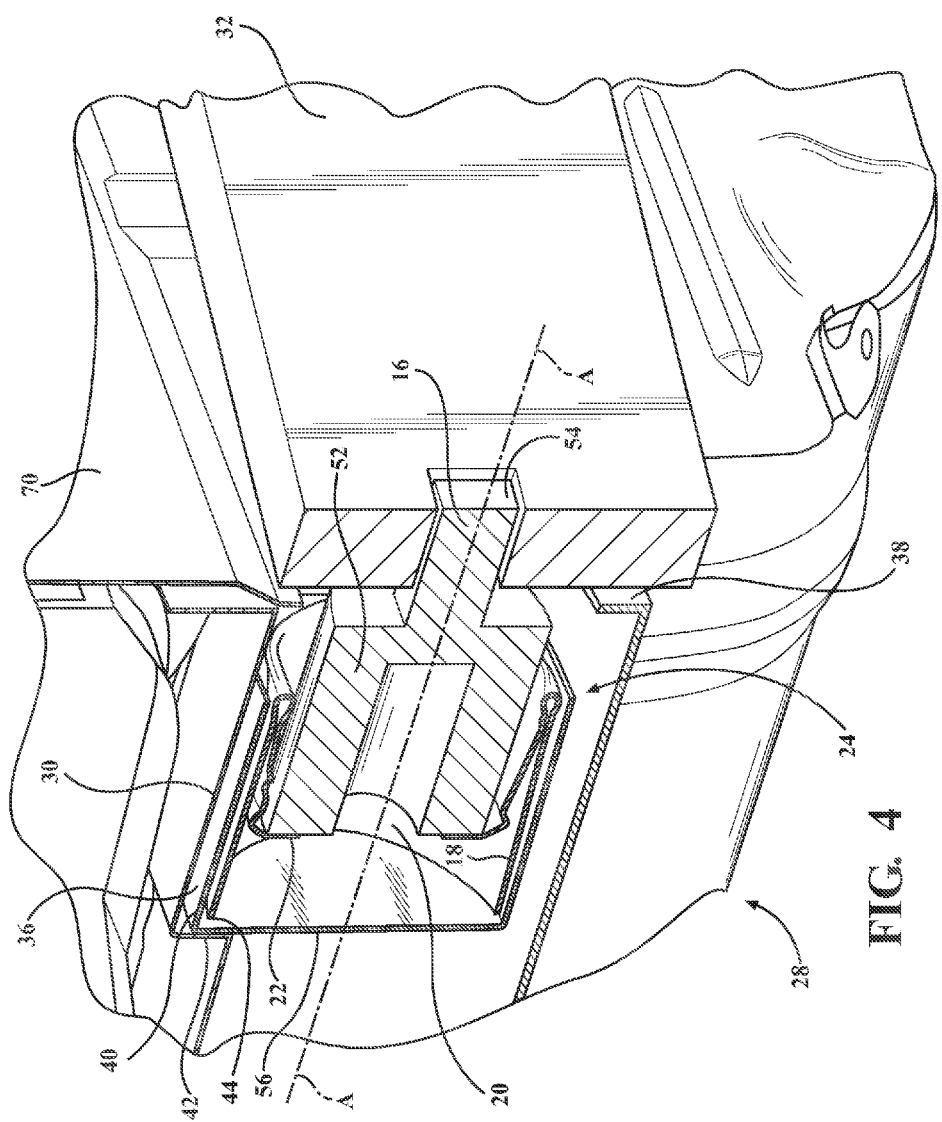
FIG. 4 is a cross-sectional view of the energy absorbing system 11 with the plunger in a retracted position relative to the deformable wall.

The plunger 16 is in an extended position, as shown in FIG. 3, in the absence of force applied to the plunger 16. When force is applied to the plunger 16, the plunger 16 moves from the extended position toward a retracted position (shown in FIG. 4). Since the deformable wall 18 collapses into the cavity 20, as shown in FIG. 4, the size of the energy absorbing device 10 is reduced without material stack up. In other words, the deformable wall 18 collapses into itself, as shown in FIG. 4. This reduces the space occupied by the energy absorbing device 10, which is beneficial for packaging constraints in the design of the bumper assembly 12.

As the deformable wall 18 collapses into itself, the force absorbed by the energy absorbing device 10 remains generally consistent as the plunger 16 moves from the extended position toward the retracted position. In other words, because the deformable wall 18 collapses into itself without material stack up, a force-distance curve for the plunger 16 and the deformable wall 18 is generally linear as the plunger 16 moves from the extended position to the retracted position.

Figure 2:
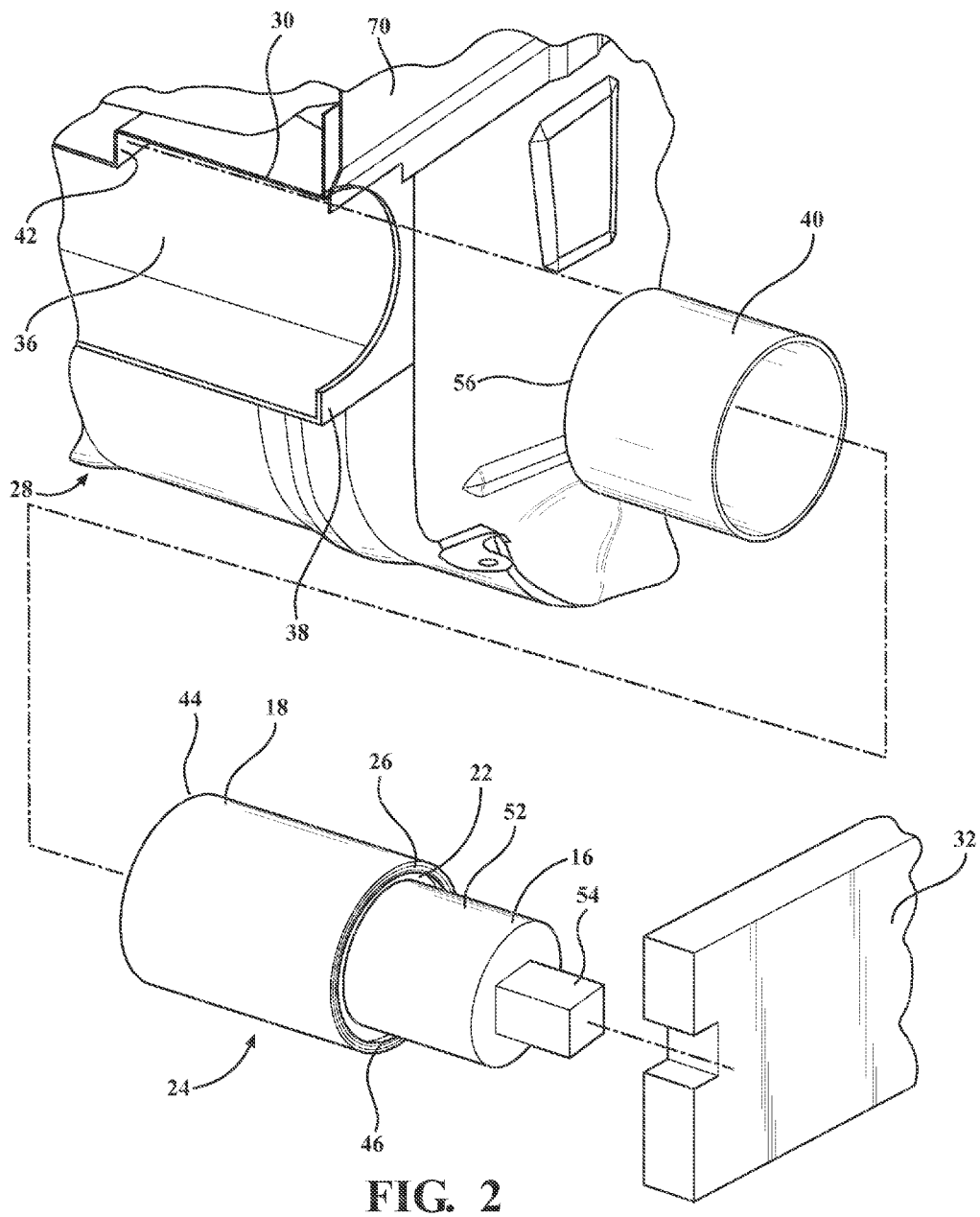
FIG. 2 is an exploded view of the energy absorbing system 11.

With reference to FIG. 2, a deformable member 24 includes the deformable wall 18 and the ledge 22. As set forth further below, the deformable member 24 may include a lip 26 connecting the deformable wall 18 and the ledge 22.

With reference to FIGS. 1-4, the vehicle 14 includes a frame 28. The frame 28, for example, includes at least one rail 30. A back panel 70 may be supported by the frame 28 adjacent the rail 30. The back panel 70 may be deformable relative to the bumper assembly 12. The back panel 70 may be, for example, formed of sheet metal. The frame 28 may be of any suitable type.

The bumper assembly 12 of the vehicle 14 may be supported on the frame 28, e.g., supported on the rail 30. The bumper assembly 12 may include a bumper beam 32, a fascia 34 concealing the bumper beam 32, and any other structure, plates, etc. (not shown). The energy absorbing device 10 may, at least in part, support the bumper assembly 12 on the frame 28.

The energy absorbing device 10 is disposed between the bumper beam 32 to the frame 28. The plunger 16 may be connected to the bumper beam 32 and the deformable member 24, e.g., the deformable wall 18, may be connected to the frame 28. Specifically, as set forth above, the ledge 22 is fixed to the deformable wall 18, and the plunger 16 contacts the ledge 22.

An energy absorbing system 11 of the vehicle 14 includes the energy absorbing device 10, the bumper beam 32, and the rail 30. The energy absorbing system 11 absorbs energy when the bumper assembly 12 is impacted during a collision between the vehicle 14 and another object (not shown). Specifically, when the bumper beam 32 is impacted by a force, the bumper beam 32 is biased toward the frame 28. If the force against the bumper beam 32 is sufficient, the plunger 16 deforms the deformable wall 18 as the plunger 16 moves from the extended position toward the retracted position.

The frame 28 may define a recess 36 receiving the deformable member 24, e.g., the deformable wall 18. The frame 28 may define an outer surface 38 through which the recess 36 extends. When disposed in the recess 36 with the plunger 16 in the extended position, the deformable member 24 may be partially or completely recessed relative to the outer surface 38. The deformable wall 18 of the deformable member 24 may be partially or completely recessed relative to the outer surface 38.

With reference to FIG. 4, the recess 36 and the deformable member 24 may be configured to allow the bumper beam 32 to approach the frame 28 and nearly contact the frame when the plunger 16 is in the recessed position, i.e., to minimize set-off distance between the bumper beam 32 and the frame 28 when the plunger 16 is in the recessed position. For example, the recess 36 and the plunger 16 may be sized along the axis A to allow for the bumper beam 32 to nearly contact the frame 28 when the plunger 16 is in the recessed position. The plunger 16 spaces the bumper beam 32 from the frame 28 when the plunger 16 is in the recessed position to prevent damage caused by contact between the bumper beam 32 and the frame 28 and/or back panel 70.

The deformable member 24 may include an outer case 40 disposed in the recess 36. The outer case 40 receives the deformable member 24, e.g., the deformable wall 18, for coupling the deformable member 24, e.g., the deformable wall 18, to the vehicle 14, i.e., to couple the deformable wall 18 to the frame 28 in the recess 36. The outer case 40 may define a cavity 20 receiving the deformable wall 18 of the deformable member 24. The outer case 40 may present an end wall 56 in the recess 36 for abutting the deformable wall 18.

The outer case 40 is retained in the recess 36 in any suitable fashion. For example, the outer case 40 may be bolted to the frame 28, press-fit in the recess 36, etc. The frame 28 may present a shoulder 42 in the recess 36 that abuts the outer case 40. The outer case 40 may be formed of metal or any other suitable material. The outer case 40 may be cylindrical, as best shown in FIG. 2.

The deformable member 24 may be retained in the cavity 20 of the outer case 40 in any suitable fashion. For example, the deformable wall 18 may be press-fit in the cavity 20, fastened to the outer case 40, etc. The deformable wall 18 may include an open, circular end 44 that abuts the end wall 56. The deformable wall 18 may be cylindrical, as best shown in FIG. 2.

As set forth above, the ledge 22 is fixed to the deformable wall 18 and extends in a direction from the deformable wall 18 toward the axis A. The ledge 22 may be disposed at a second end 46 of the deformable wall 18 spaced from the open, circular end 44. The ledge 22 may be perpendicular to the axis A, as shown in the Figures, and may be annular in shape.

As set forth above, the deformable member 24 may include the lip 26 connecting the deformable wall 18 and the ledge 22. With reference to FIGS. 3 and 4, the lip 26 guides the deformable wall 18 into the cavity 20 during collapse of the deformable wall 18 in response to force applied along the axis A by the plunger 16.

The lip 26 may include a curved portion 48 curving from the deformable wall 18 toward the axis A and an inner wall 50 extending along the axis A from the curved portion 48 to the ledge 22. The lip 26 may extend into the cavity 20 from the deformable wall 18 to the ledge 22, i.e., the ledge 22 may be recessed toward the cavity 20 relative to the curved portion 48. Specifically, the lip 26 may, for example, curve 180 degrees, as shown in the Figures. In such a configuration, the lip 26 may be semi-circular in cross-section, as shown in FIGS. 3 and 4.

The lip 26 may extend circumferentially about the deformable wall 18. The lip 26 may extend continuously about the circumference of the deformable wall 18 and continuously from the deformable wall 18 to the ledge 22.

The deformable member 24 may be configured such that the deformable wall 18 and/or the lip 26 plastically deforms to absorb energy. For example, as shown in FIG. 4, the lip 26 may deform to guide the plunger 16 into the deformable wall 18 and the deformable wall 18 may plastically deform to absorb energy as the plunger 16 enters the cavity 20. The deformable wall 18 and/or the lip 26 may be configured to tear, split, etc. (not shown), as the plunger 16 enters into the cavity to absorb energy.

The deformable member 24 may be a single integral unit. Specifically, the lip 26, the ledge 22, and the deformable wall 18 may be integral, i.e., formed simultaneously as a single unit. For example, the lip 26, ledge 22, and deformable wall 18 may be stamped, molded, etc., as a single unit. The deformable member 24, i.e., the cylindrical wall, the ledge 22, and the lip 26, may be formed of metal or any other suitable material.

The plunger 16 may be connected to the bumper beam 32 such that the plunger 16 may remain in contact with the ledge 22 during a collision. The plunger 16 may be connected to the bumper beam 32 in any suitable fashion.

The plunger 16 engages the ledge 22 between the deformable wall 18 and the axis A. In other words, the plunger 16 engages the ledge 22 within the deformable wall 18 such to collapse the deformable wall 18 inwardly, as shown in FIG. 4.

The plunger 16 may be fixed to the ledge 22 in any suitable fashion. For example, the plunger 16 may be welded to the ledge 22. Alternatively, the plunger 16 and the ledge 22 may be integral, i.e., formed simultaneously as a single unit.

The plunger 16 includes an outer diameter OD and the deformable wall 18 includes an inner diameter ID larger than the outer diameter OD of the plunger 16. As such, the deformable wall 18 may telescopically receive the plunger 16 as the plunger 16 moves from the extended position to the retraced position, as shown in FIG. 4.

The plunger 16 includes a body 52 contacting the ledge 22 and a neck 54 pivotally coupled to the bumper beam 32. The neck 54 is thinner about the axis A than the body 52. The plunger 16 may be formed of any suitable material, such as metal.

During operation, before a collision of the vehicle 14 with another object, the bumper beam 32 is spaced from the frame 28, as shown in FIG. 2. Specifically, as set forth above, the plunger 16 is in the extended position, i.e., the deformable wall 18 is not deformed.

In the event of a collision of the vehicle 14 with another object that biases the bumper beam 32 toward the frame 28, the deformable member 24, which is coupled to the bumper beam 32 through the plunger 16, resists movement of the bumper beam 32 toward the frame 28. If the collision exerts sufficient force on the bumper beam 32, e.g., 65-70 kN, the force overcomes the deformable wall 18 and collapses the deformable wall 18 into the cavity 20. The deformation of the deformable wall 18 absorbs energy to cushion the impact during the collision. In other words, the cold working of the deformable wall 18 absorbs energy during the collision. Depending on the magnitude of the force applied to the deformable wall 18 during the collision, the deformable wall 18 may deform to any position along the axis A.

After the collision, the energy absorbing system 11 may be repaired by replacing the deformable member 24 and the plunger 16. For example, the deformable member 24 may be disconnected from the frame 28, e.g., by unbolting, and the plunger 16 may be unpinned from the bumper beam 32. A new deformable member 24 may then be connected to the frame 28 and a new plunger 16 may be pinned to the bumper beam 32.

The energy absorbing capability of the energy absorbing system 11 may be tuned to absorb a desired level of energy by varying the thickness of the deformable wall 18 and/or by varying the thickness and/or shape of the lip 26.

The vehicle 14 may be, for example, an automobile. The bumper assembly 12 may be a rear bumper assembly 12 or a front bumper assembly 12 of the vehicle 14.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. An energy absorbing device for a bumper assembly of a vehicle, the energy absorbing device comprising:
   a plunger;
   a deformable wall extending along an axis and defining a cavity for receiving the plunger and configured to plastically deform during relative movement between the plunger and the deformable wall;
   a ledge fixed to the deformable wall and extending between the cavity and the plunger for collapsing the deformable wall into the cavity; and
   an outer case receiving the deformable wall for coupling the deformable wall to the vehicle, the outer case being cylindrical and extending entirely around a perimeter of the deformable wall.

2. The energy absorbing device as set forth in claim 1 further comprising a lip connecting the deformable wall and the ledge and extending into the cavity from the wall to the ledge.

3. The energy absorbing device as set forth in claim 2 wherein the deformable wall extends along an axis, and wherein the lip includes a curved portion curving from the deformable wall toward the axis and an inner wall extending along the axis from the curved portion to the ledge.

4. The energy absorbing device as set forth in claim 2 wherein the lip is semi-circular in cross-section.

5. The energy absorbing device as set forth in claim 2 wherein the deformable wall is cylindrical and wherein the lip extends circumferentially about the deformable wall.

6. The energy absorbing device as set forth in claim 1 wherein the deformable wall extends along an axis and the ledge extends in a direction from the deformable wall toward the axis.

7. The energy absorbing device as set forth in claim 6 wherein the plunger engages the ledge between the deformable wall and the axis.

8. The energy absorbing device as set forth in claim 6 wherein the ledge is perpendicular to the axis.

9. The energy absorbing device as set forth in claim 1 wherein the deformable wall is cylindrical.

10. The energy absorbing device as set forth in claim 1 wherein the plunger includes an outer diameter and the deformable wall includes an inner diameter larger than the outer diameter of the plunger.

11. An energy absorbing system for a vehicle, the energy absorbing system comprising:
    a bumper beam;
    a plunger connected to the bumper beam;
    a deformable wall extending along an axis and defining a cavity for receiving the plunger and configured to plastically deform during relative movement between the plunger and the deformable wall;
    a ledge fixed to the deformable wall and extending between the cavity and the plunger for collapsing the deformable wall into the cavity;
    a frame for the vehicle, the frame defining a recess receiving the deformable wall; and
    an outer case disposed in the recess and receiving the deformable wall for coupling the deformable wall to the vehicle, the outer case being cylindrical and extending entirely around a perimeter of the deformable wall.

12. The energy absorbing system as set forth in claim 11 wherein the plunger is pivotally connected to the bumper beam.

13. The energy absorbing system as set forth in claim 12 wherein the bumper beam defines an opening, and wherein the plunger includes a neck disposed in the opening.

14. The energy absorbing system as set forth in claim 11 further comprising a lip connecting the deformable wall and the ledge and extending into the cavity from the wall to the ledge.

15. The energy absorbing system as set forth in claim 14 wherein the deformable wall is cylindrical and wherein the lip extends circumferentially about the deformable wall.

16. The energy absorbing system as set forth in claim 11 wherein the deformable wall extends along an axis and the ledge extends from the deformable wall toward the axis.

17. The energy absorbing system as set forth in claim 16 wherein the plunger engages the ledge between the deformable wall and the axis.

18. The energy absorbing system as set forth in claim 11 wherein the plunger includes an outer diameter and the deformable wall includes an inner diameter larger than the outer diameter of the plunger.

19. An energy absorbing system for a vehicle, the energy absorbing system comprising:
    a bumper beam;
    a deformable wall defining a cavity;
    a plunger connected to the bumper beam and moveable relative to the deformable wall into the cavity from an extended position to a recessed position, the deformable wall being configured to plastically deform during movement of the plunger from the extended position to the recessed position;
    a ledge fixed to the deformable wall and extending between the cavity and the plunger; and
    a frame for the vehicle, the frame including an outer surface and a recess extending through the outer surface and receiving the deformable wall;
    wherein the deformable wall is completely recessed relative to the outer surface when the deformable wall plastically deforms to the recessed position.

20. The energy absorbing system as set forth in claim 19 further comprising an outer case disposed in the recess and receiving the deformable wall, the outer case being cylindrical and extending entirely around a perimeter of the deformable wall.

* * * * *